(12) United States Patent
Knutson

(10) Patent No.: US 10,213,968 B2
(45) Date of Patent: Feb. 26, 2019

(54) DYNAMIC FORMING TOOLS FOR COMPOSITE PARTS

(71) Applicant: The Boeing Company, Chicago, IL (US)

(72) Inventor: Samuel James Knutson, Charleston, SC (US)

(73) Assignee: The Boeing Company, Chicago, IL (US)

(*) Notice: Subject to any disclaimer, the term of this patent is extended or adjusted under 35 U.S.C. 154(b) by 252 days.

(21) Appl. No.: 15/060,981

(22) Filed: Mar. 4, 2016

(65) Prior Publication Data

US 2017/0252982 A1    Sep. 7, 2017

(51) Int. Cl.

| | | |
|---|---|---|
| *B29L 9/00* | (2006.01) | |
| *B29C 53/02* | (2006.01) | |
| *B29C 70/34* | (2006.01) | |
| *B29C 70/44* | (2006.01) | |
| *B29C 70/56* | (2006.01) | |
| *B29C 33/30* | (2006.01) | |
| *B29C 70/02* | (2006.01) | |
| *B29K 307/04* | (2006.01) | |

(52) U.S. Cl.
CPC .......... *B29C 70/021* (2013.01); *B29C 33/308* (2013.01); *B29C 53/02* (2013.01); *B29C 70/342* (2013.01); *B29C 70/44* (2013.01); *B29C 70/56* (2013.01); *B29K 2307/04* (2013.01); *B29L 2009/00* (2013.01)

(58) Field of Classification Search
CPC ............................ B29C 70/021; B29C 33/308
USPC .......................................................... 264/511
See application file for complete search history.

(56) References Cited

U.S. PATENT DOCUMENTS

| | | | | |
|---|---|---|---|---|
| 4,486,490 A | * | 12/1984 | Patz ........................ | B29C 70/16 427/383.5 |
| 6,280,174 B1 | * | 8/2001 | Lichtinger .......... | B29C 33/0038 425/437 |
| 6,814,916 B2 | | 11/2004 | Willden et al. | |
| 8,029,719 B2 | * | 10/2011 | Petersson ................ | B29C 43/12 264/316 |
| 8,142,181 B2 | | 3/2012 | Willden et al. | |

(Continued)

FOREIGN PATENT DOCUMENTS

| | | | | |
|---|---|---|---|---|
| FR | 1420472 A | * | 12/1965 | .......... B29C 51/262 |
| JP | 2007253441 A | | 10/2007 | |
| JP | 2010115867 A | | 5/2010 | |

OTHER PUBLICATIONS

Machine translation of JP 2007253441.*

(Continued)

*Primary Examiner* — Robert C Dye
*Assistant Examiner* — Russell E Sparks
(74) *Attorney, Agent, or Firm* — Duft & Bornsen, PC

(57) ABSTRACT

Systems and methods are provided for dynamically altering the shape of a forming tool for a composite part during forming. An exemplary forming tool includes a main body that holds a first portion of a multi-layer laminate, and a platform that holds a second portion of the laminate aligned with the first portion. The forming tool also includes a biasing device that repositions the second portion with respect to the first portion during forming of the laminate, causing shear stresses between the layers of the laminate.

6 Claims, 15 Drawing Sheets

(56) References Cited

U.S. PATENT DOCUMENTS

| | | | |
|---|---|---|---|
| 8,454,876 B2* | 6/2013 | Graeber | B29C 70/56 |
| | | | 264/257 |
| 2003/0146543 A1 | 8/2003 | Lebrun et al. | |
| 2012/0061871 A1 | 3/2012 | Thaden et al. | |
| 2014/0027048 A1 | 1/2014 | Hawkins et al. | |
| 2015/0084237 A1* | 3/2015 | Siagam | B29B 11/16 |
| | | | 264/299 |

OTHER PUBLICATIONS

Machine translation of FR 1420472 (Year: 1965).*
European Search Report; Appl 16207266.4.-1703; dated Jun. 28, 2017.

* cited by examiner

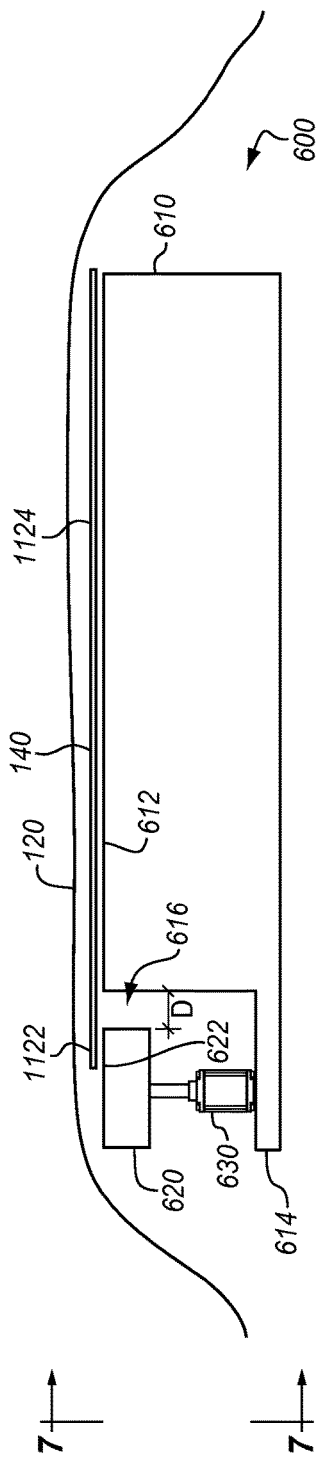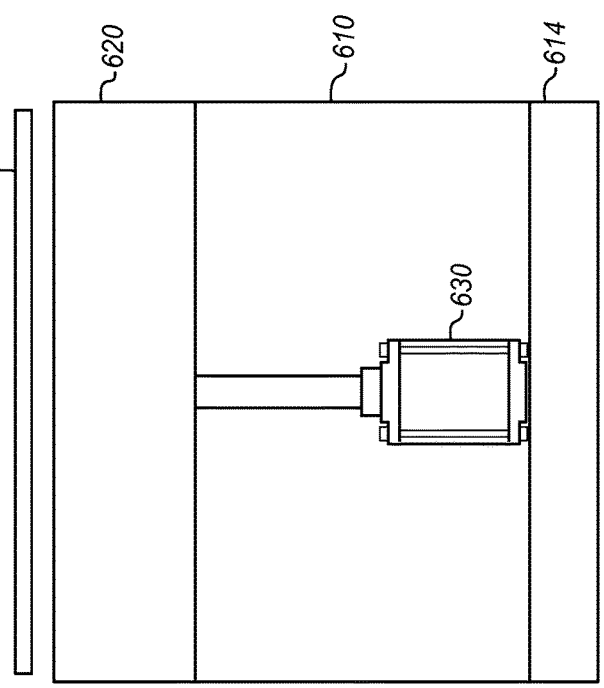

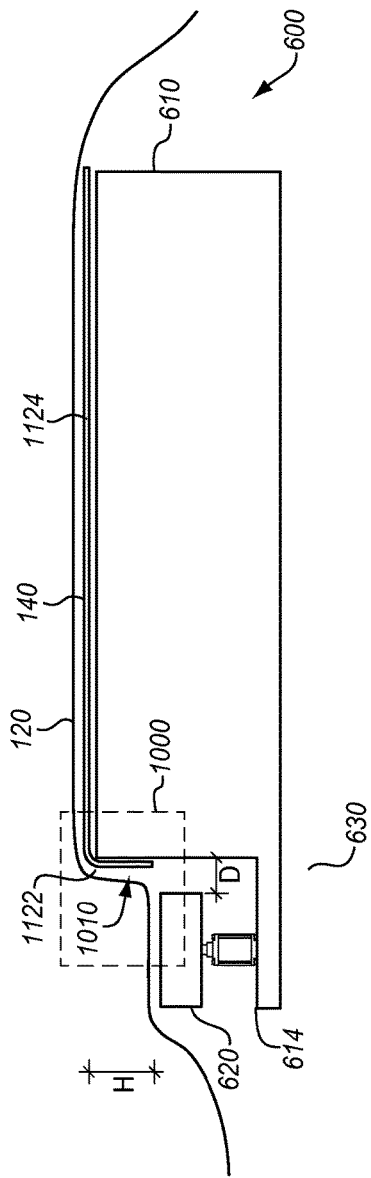

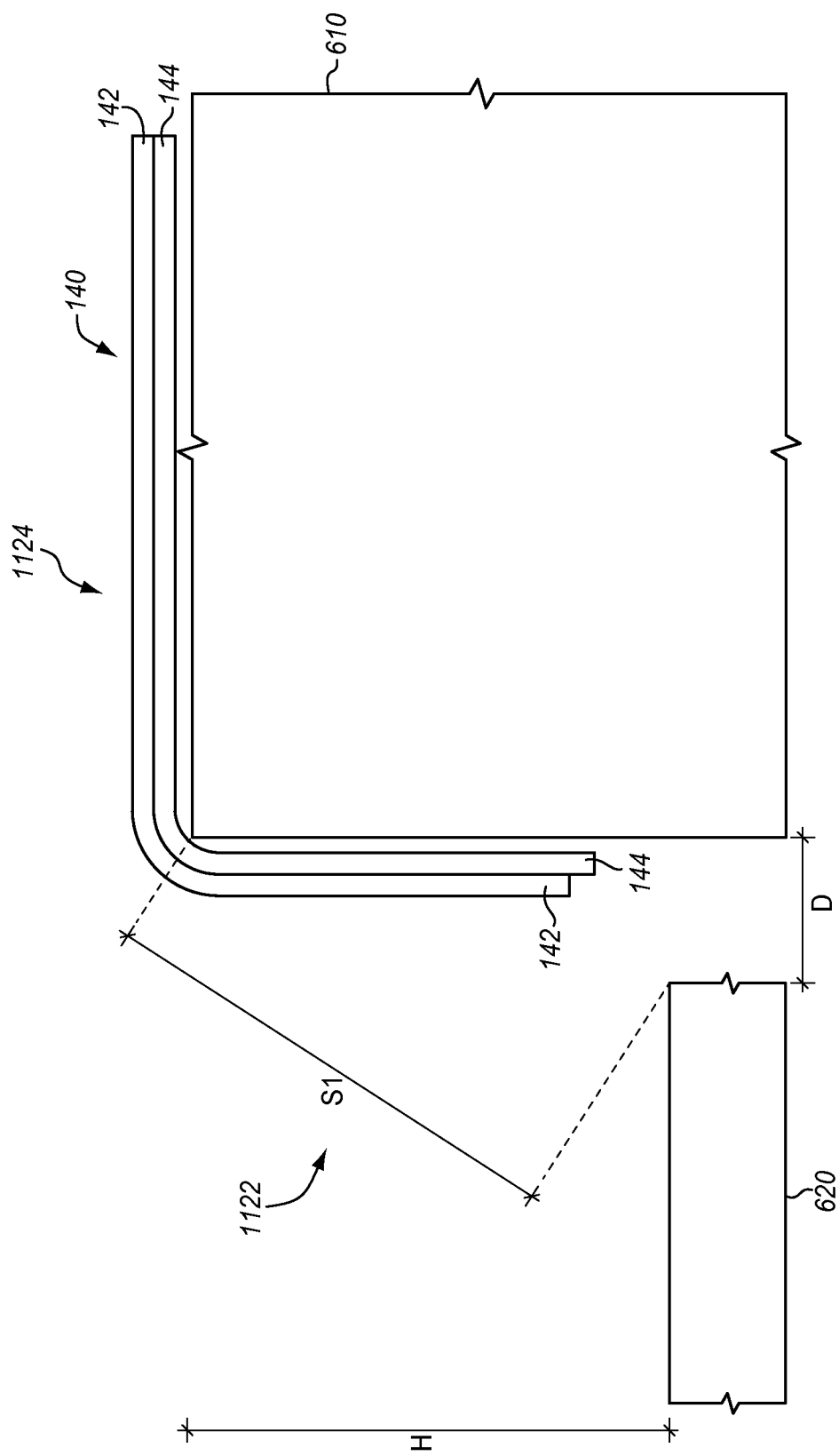

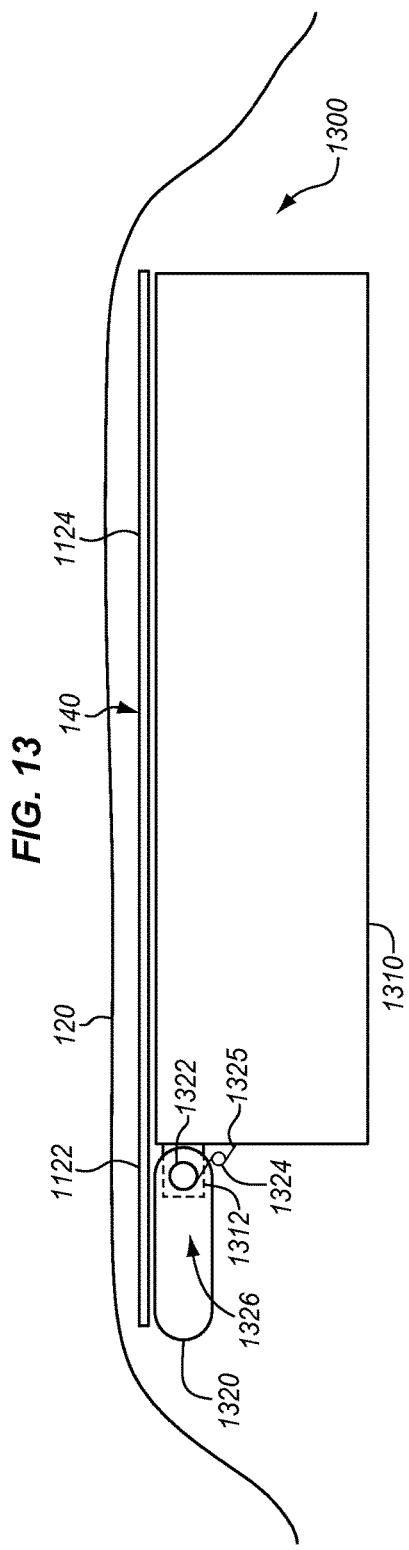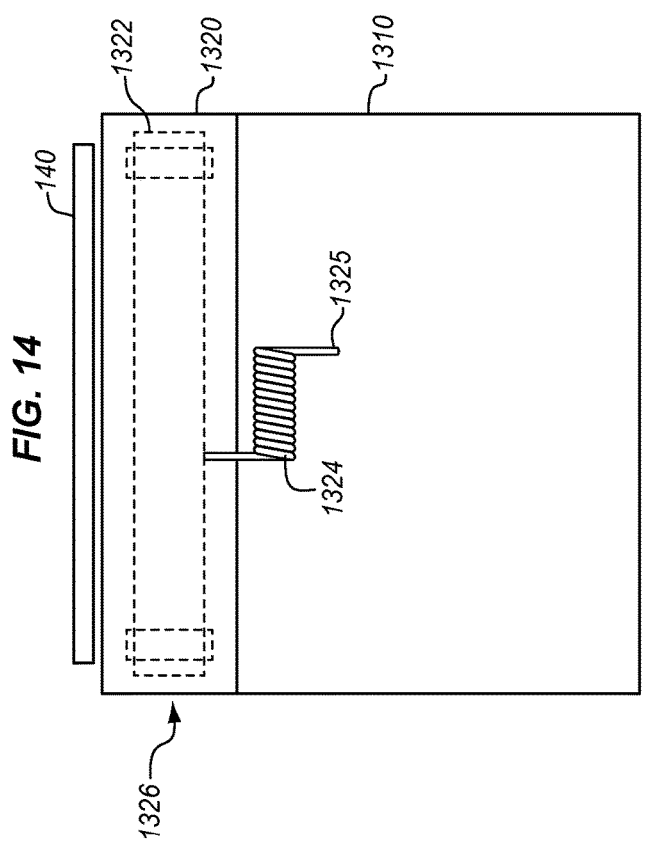

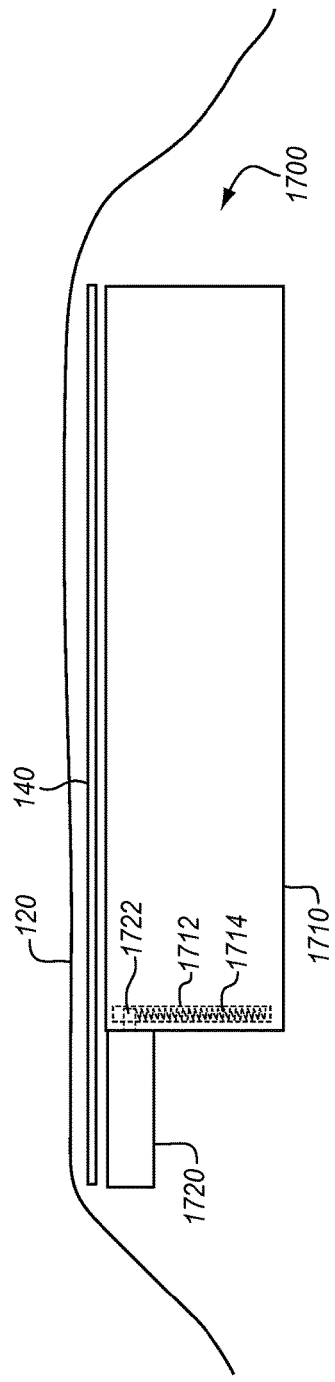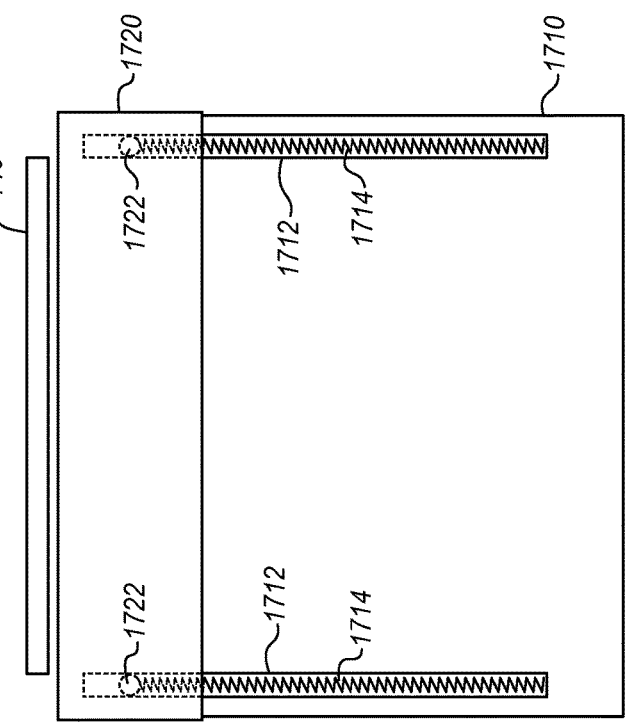

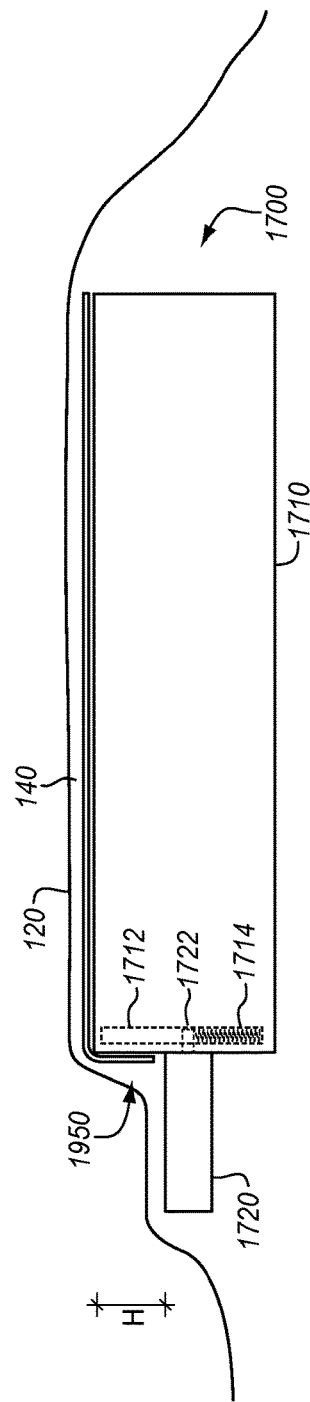
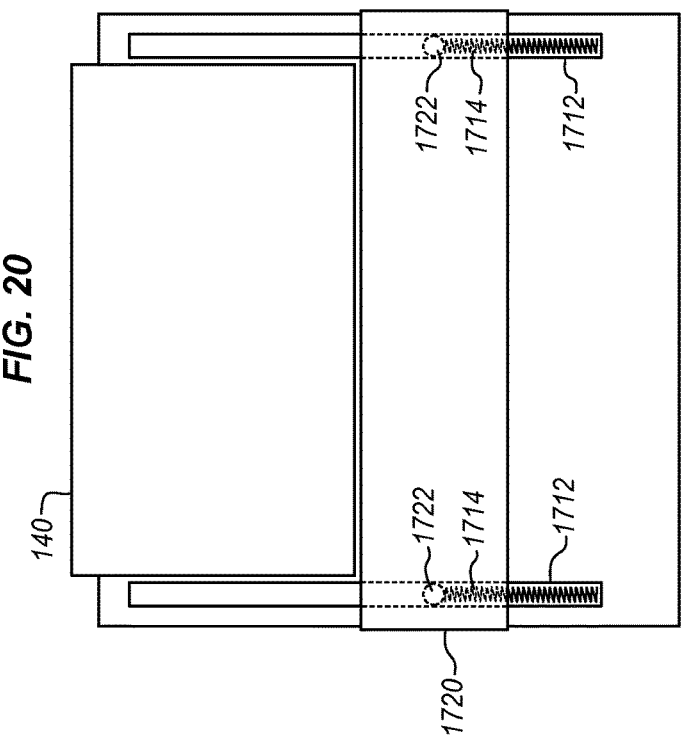

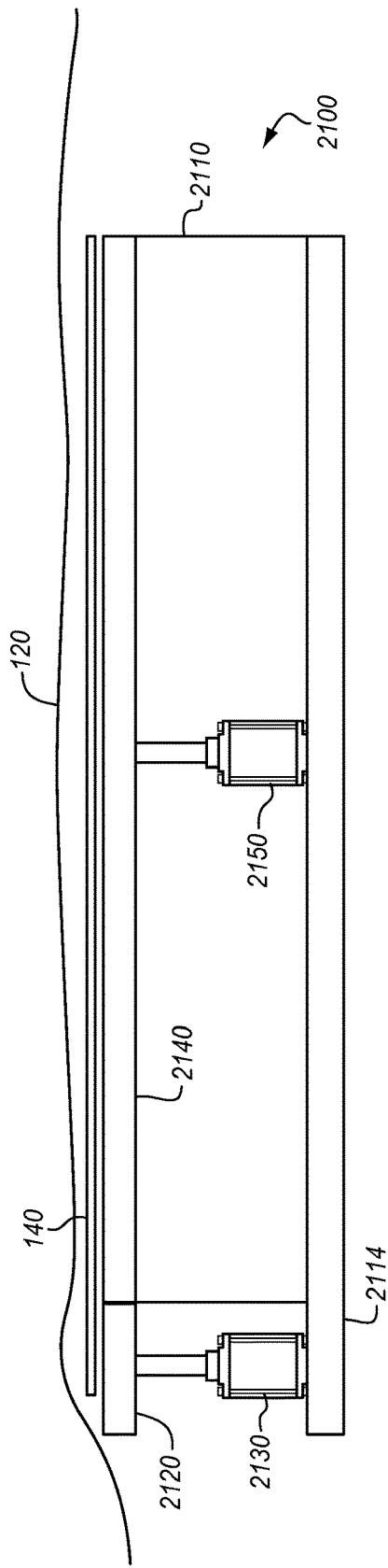
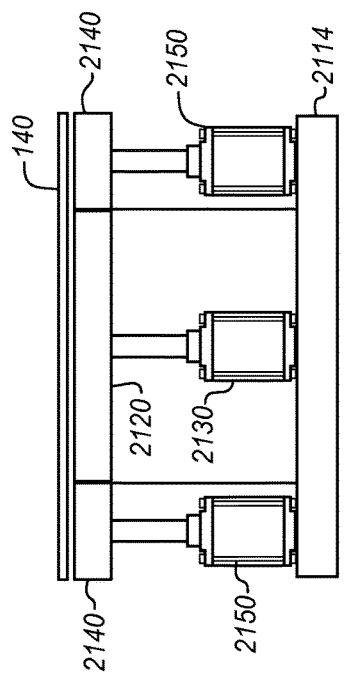

DYNAMIC FORMING TOOLS FOR COMPOSITE PARTS

FIELD

The disclosure relates to the field of curable composite parts, and in particular, to forming tools for composite parts.

BACKGROUND

Many composite parts (e.g., carbon fiber products, such as aircraft wings) are manufactured via vacuum bag manufacturing processes. Using these techniques, layers/plies of constituent material are laid-up to form a laminate and pressed against a forming tool by a vacuum bag. The vacuum bag applies pressure to contour and consolidate the layers against the surface of the forming tool. The laminate may further be cured, ensuring the formation of a suitably shaped composite part.

For composite parts that exhibit a complex geometry, it is difficult to design forming tools that adequately support a laminate before and/or during forming (e.g., so that the laminate does not droop during forming), and also enable the laminate to achieve a complex shape during the forming process. Hence, composite part designers continue to seek out enhanced techniques to form composites.

SUMMARY

Embodiments described herein utilize forming tools that are capable of dynamically changing the shape of a laminate while the laminate is forming into a desired shape for a composite part. This allows for complex composite parts to be created utilizing a vacuum bag forming process. The forming tools are capable of achieving this beneficial result by adjusting their own shape (e.g., in response to pressure applied by a vacuum bag or via other means).

One embodiment comprises a forming tool for dynamically altering the shape of a laminate. The forming tool includes a main body that holds a first portion of a multi-layer laminate, and a platform that holds a second portion of the laminate aligned with the first portion. The forming tool also includes a biasing device that repositions the second portion with respect to the first portion during forming of the laminate, causing shear stresses between the layers of the laminate.

Another embodiment is a method for dynamically altering the shape of a laminate. The method includes laying up a multi-layer laminate that includes a first portion on a main body of a forming tool, and a second portion on a platform of the forming tool. The second portion is aligned with the first portion. The method also includes covering the laminate with a vacuum bag, and repositioning the second portion with respect to the first portion during forming of the laminate, causing shear stresses between the layers of the laminate.

Another embodiment is a system that includes a forming tool and a multi-layer laminate laid-up onto the forming tool. The system also includes a vacuum bag covering the laminate. The forming tool includes a main body that holds a first portion of the laminate, and a platform that holds a second portion of the laminate aligned with the first portion. The forming tool also includes a biasing device that repositions the second portion with respect to the first portion during forming of the laminate, causing shear stresses between the layers of the laminate.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 6-7 are views illustrating a first forming tool in an exemplary embodiment.

FIGS. 8-9 are views illustrating the first forming tool after forming has begun in an exemplary embodiment.

FIG. 10 is a zoomed in view of a forming tool in an exemplary embodiment.

FIGS. 13-14 are views illustrating a second forming tool in an exemplary embodiment.

FIGS. 17-18 are views illustrating a third forming tool in an exemplary embodiment.

FIGS. 19-20 are views illustrating the third forming tool after forming has begun in an exemplary embodiment.

FIGS. 21-22 are views illustrating a fourth forming tool in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

FIGS. 1-5 illustrate exemplary techniques for forming and/or curing a composite part via vacuum bagging techniques. Specifically, these FIGS. illustrate exemplary preparation and set up processes that may be performed to prepare a laminate of constituent material (e.g., carbon fiber) for vacuum bag forming of a composite part.

Figure 1:
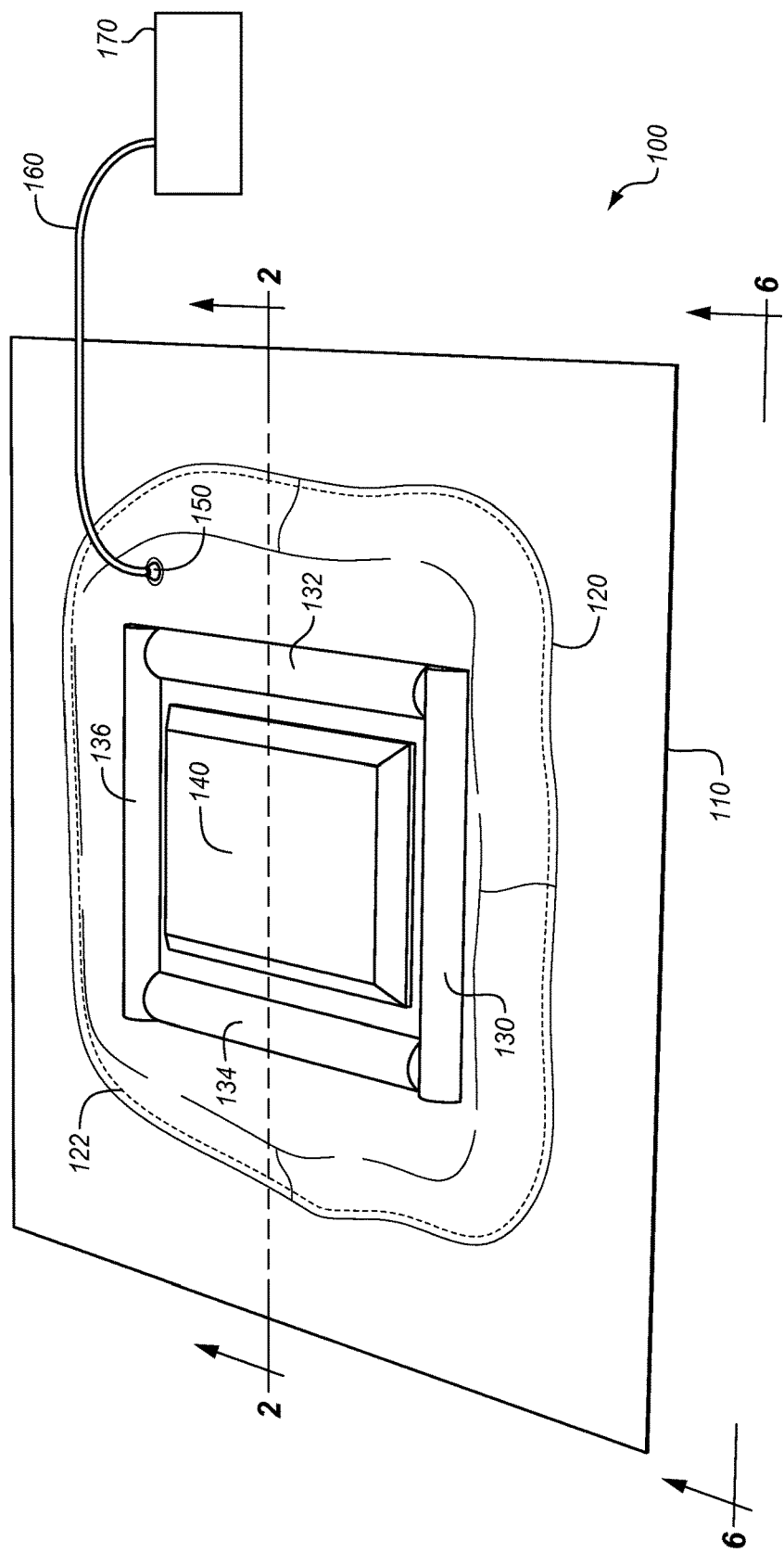
FIG. 1 is a diagram of a vacuum bag manufacturing system in an exemplary embodiment.

FIG. 1 is a block diagram of a vacuum bag manufacturing system 100 in an exemplary embodiment. System 100 comprises any combination of components and/or devices that are capable of utilizing vacuum bag techniques to consolidate, form, and/or cure a laminate 140 into a composite part (e.g., a fiber reinforced composite part such as an aircraft wing or any other suitable component).

In this embodiment, system 100 includes forming tool 110, which forms a surface about which laminate 140 conforms to during manufacturing. Laminate 140 may comprise a "prepreg" carbon fiber laminate that already includes a curable resin, or any suitable curable laminate. As shown in FIG. 1, laminate 140 is held in place on tool 110 via vacuum bag 120, which is taped/sealed via edge sealant 122 to surround laminate 140 on tool 110 (e.g., an enhanced, dynamically reshapable tool). Edge breathers 130, 132, 134, and 136 surround laminate 140 and are sealed to laminate 140 via vacuum bag 120. The edge breathers (130, 132, 134, 136) provide passageways for air and volatile gases from the curing process to travel within vacuum bag 120. These volatile gases then exit vacuum bag 120 via port 150, which operates as a fitting for vacuum line 160. Vacuum line 160 is powered in this embodiment by compressor 170.

While in operation in one embodiment, compressor 170 may evacuate air from vacuum bag 120. Removing the air under vacuum bag 120 allows atmospheric pressure to press the vacuum bag against the laminate 140. This holds vacuum bag 120 against laminate 140 to conform laminate 140 to tool 110. The pressure also causes vacuum bag 120 to tightly conform to the edge breathers (130, 132, 134, 136). This provides a benefit in holding laminate 140 tightly against the contours of tool 110 as laminate 140 cures, and also provides a benefit in that it draws out air bubbles that would otherwise be formed during the curing process. The curing process itself may further involve the application of substantial amounts of pressure and/or heat (e.g., within an autoclave).

Figure 2:
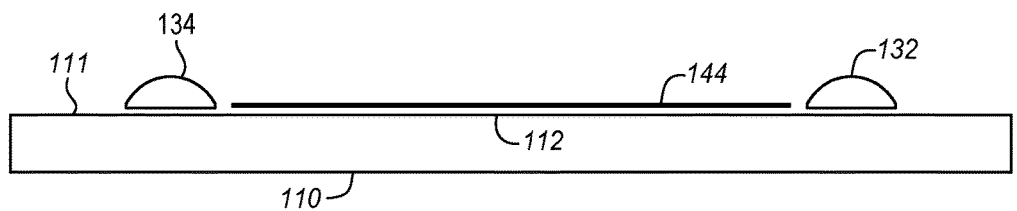
FIGS. 2-5 are section cut views illustrating preparation of a vacuum bag manufacturing system in an exemplary embodiment.
Figure 3:
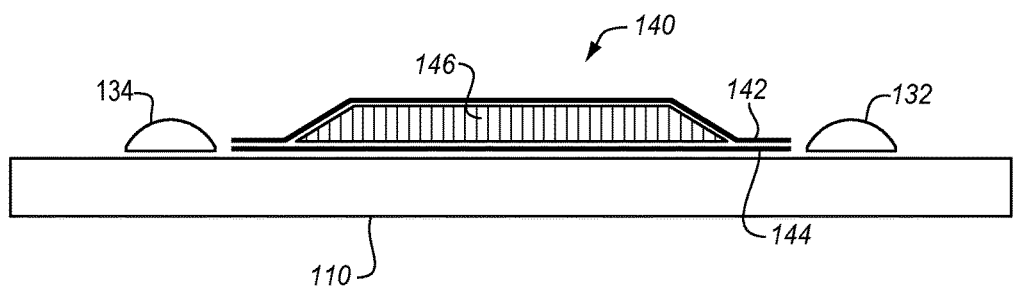

FIGS. 2-5 are section cut side views of system 100, as system 100 is assembled in an exemplary embodiment. This view is represented by view arrows 2 of FIG. 1. Further description of system 100 will therefore be provided with respect to FIGS. 2-5, which discuss the order in which various components may be assembled in order to facilitate vacuum bag manufacturing. FIG. 2 illustrates tool 110 in a resting state. The top surface 111 of tool 110 may be coated with a release agent 112 in order to ensure that parts placed atop tool 110 do not bind to tool 110 during and/or after the curing process. Edge breathers (e.g., 132, 134) are placed onto tool 110, as is layer/ply 144 of laminate 140. FIG. 3 illustrates that lay-up of laminate 140 has been completed. In this embodiment, laminate 140 consists of layers/plies 142 and 144 as well as core 146, although in further embodiments a solid laminate composite may take the place of core 146. Any suitable composite structure may be utilized for laminate 140. Edge breathers 132 and 134 are placed proximate to laminate 140, and act as lanes for air proximate to laminate 140 to be drawn away from laminate 140. This ensures that air bubbles (not shown) will not interfere with the curing of laminate 140.

Figure 4:
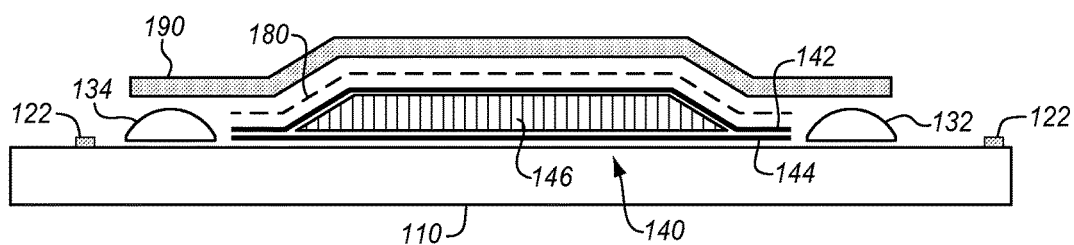

FIG. 4 illustrates that an edge sealant 122 (e.g., a double sided tape) has been applied onto tool 110 at the periphery of the edge breathers (e.g., 132, 134). FIG. 4 further illustrates the application of parting film 180 to laminate 140, as well as the application of a surface breather 190 atop parting film 180 and edge breathers 132 and 134. Parting film 180 may comprise a permeable Teflon layer that prevents laminate 140 from sticking to other components. The edge breathers (130, 132, 134, 136), in combination with surface breather 190, form passageways for air and volatile gases to exit laminate 140 before and/or during curing. Specifically, surface breather 190 provides a porous lane through which air may travel to exit the system.

Figure 5:
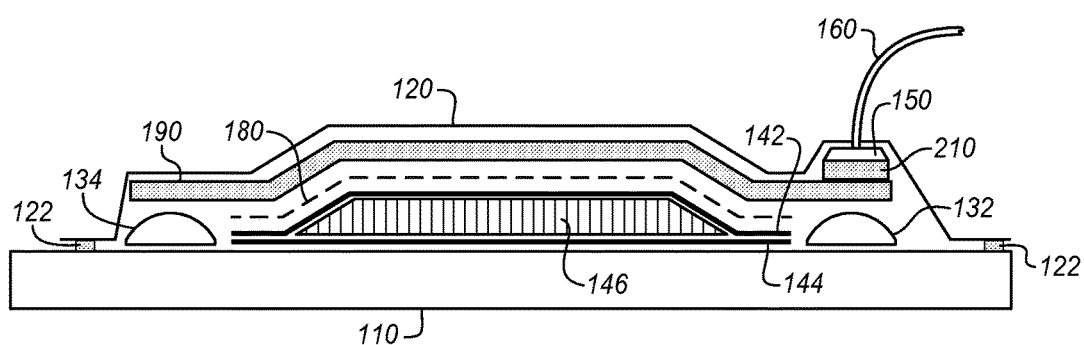

According to FIG. 5, surface breather 190 and the components beneath it are sealed onto tool 110 by vacuum bag 120, which is attached via edge sealant 122 to tool 110. Probe pad 210 provides a small breather channel proximate to port 150, to which vacuum hose 160 is attached. Vacuum hose 160 may then draw out air from vacuum bag 120, thereby pressing laminate 140 onto tool 110. Heat and/or pressure may then be applied to cure/harden laminate 140.

In some embodiments, additional layers of constituent material may be added onto laminate 140 after laminate 140 has completed curing. In such embodiments, new "green" layers are added to laminate 140 and cured, and then additional new "green layers" are added again. Utilizing this technique, a manufacturer may add several thousands of an inch of thickness to laminate 140 at a time until laminate 140 is completed. In further embodiments, the entirety of laminate 140 may be laid up at once into a preform, for curing at once.

While traditional tooling is static in nature, the enhanced forming tools described herein are capable of altering their shape during forming processes, enabling the creation of advanced and complex composite parts. Illustrative details of the operation of system 100 (in particular, forming tools that may be utilized by system 100) will be discussed with regard to the following FIGS.

FIGS. 6-7 are views illustrating a first forming tool 600 in an exemplary embodiment. Specifically, FIG. 6 is a side view of a forming tool indicated by view arrows 6 of FIG. 1, and FIG. 7 is a front view indicated by view arrows 7 of FIG. 6. Forming tool 600 comprises any object capable of molding laminate 140 during forming in order to form a desired shape. Furthermore, forming tool 600 is capable of altering its shape (and thereby altering the shape of laminate 140) during forming. For example, forming tool 600 may change its shape in response to pressure applied by vacuum bag 120 during forming. This enables laminate 140 to be molded into any of a variety of complex shapes, while still allowing laminate 140 to be laid-up quickly and efficiently. As shown in FIG. 6, portion 1122 of laminate 140 is laid-up over platform 620, while portion 1124 of laminate 140 is laid-up over main body 610.

In this embodiment, forming tool 600 includes main body 610, support element 614, mobile platform 620, and biasing device 630. Laminate 140 is laid-up such that it covers upper surface 612 of main body 610, bridges lateral gap 616 of distance D, and extends onto upper surface 622 of platform 620. Vacuum bag 120 covers laminate 140 and is sealed to forming tool 600 as shown in FIG. 6. However, vacuum bag 120 is not shown in FIG. 7 for clarity. Biasing device 630 is attached to support element 614, and may reposition platform 620 in response to pressure applied by vacuum bag 120 to forming tool 600. Biasing device 630 may comprise a passive device such as a spring, sealed air piston, etc., or may comprise an active device such as an actuator (e.g., a linear actuator or air logic driven piston) that is capable of repositioning platform 620 in response to electronic input.

FIGS. 8-9 are views illustrating forming tool 600 after forming has begun in an exemplary embodiment. Specifically, FIG. 8 is a side view and FIG. 9 is a front view. As shown in these FIGS., when platform 620 is lowered by a height H, portion 1122 of laminate 140 changes shape.

FIG. 10 illustrates a zoomed in view of forming tool 600 in an exemplary embodiment. Specifically, FIG. 10 is a zoomed in view of area 1000 of FIG. 8. When platform 620 is lowered by height H across distance D, layers 142 and 144 experience shear forces with respect to each other along shear zone 51. These interlaminar shear forces may be desirable in order to ensure that layers of laminate 140 are properly aligned with respect to each other while curing takes place. This causes the layers to align in a "phonebook" orientation such that a lower layer 144 extends slightly beyond an upper layer 142. In such an example, individual layers 142 and 144 slip relative to each other when laminate 140 changes shape. Such slipping ensures that wrinkles do not form even though the straight line distance of layer 142 may be greater during bending than the straight line distance of layer 144.

Figure 11:
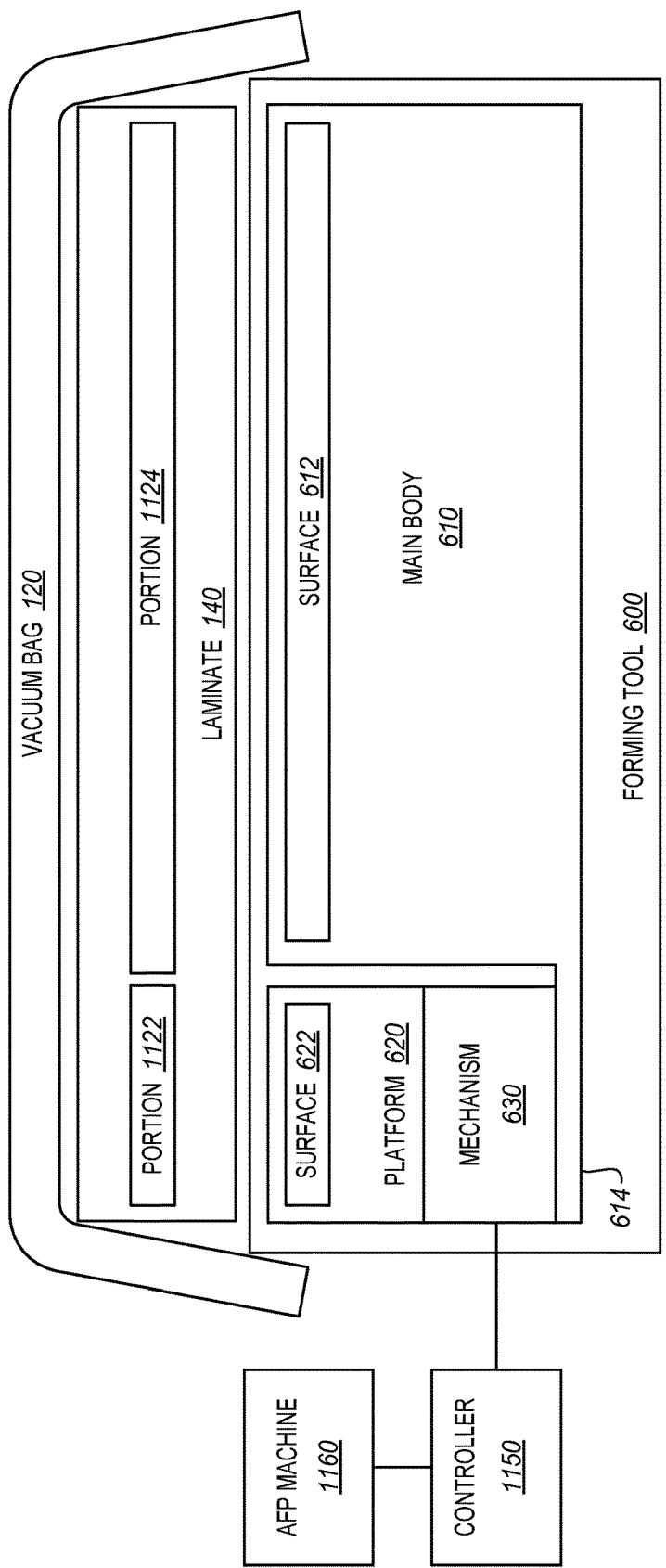
FIG. 11 is a block diagram of a forming tool in an exemplary embodiment.

FIG. 11 is a block diagram of forming tool 600 in an exemplary embodiment. According to FIG. 11, forming tool 600 includes main body 610, which has an upper surface 612. Forming tool 600 further includes support element 614, to which biasing device 630 is attached. Biasing device 630 moves platform 620. In embodiments where biasing device 630 comprises an active machine, such as a dynamic air piston, controller 1150 directs the operations of biasing device 630. Controller 1150 may be implemented, for example, as custom circuitry, as a processor executing programmed instructions, or some combination thereof. Laminate 140 is laid atop surface 612 of main body 610, and surface 622 of platform 620. That is, first portion 1124 of laminate 140 covers surface 612, while second portion 1122 of laminate 140 is covers surface 622. Vacuum bag 120 covers composite laminate 140, and is sealed to forming tool 600. Automated Fiber Placement (AFP) AFP machine 1160 may lay-up laminate 140 based on instructions from controller 1150.

Illustrative details of the operation of forming tool 600 will be discussed with regard to FIG. 12. Assume, for this embodiment, that a user has prepared forming tool 600 to receive laminate 140 (e.g., by applying a mold release agent to forming tool 600).

Figure 12:
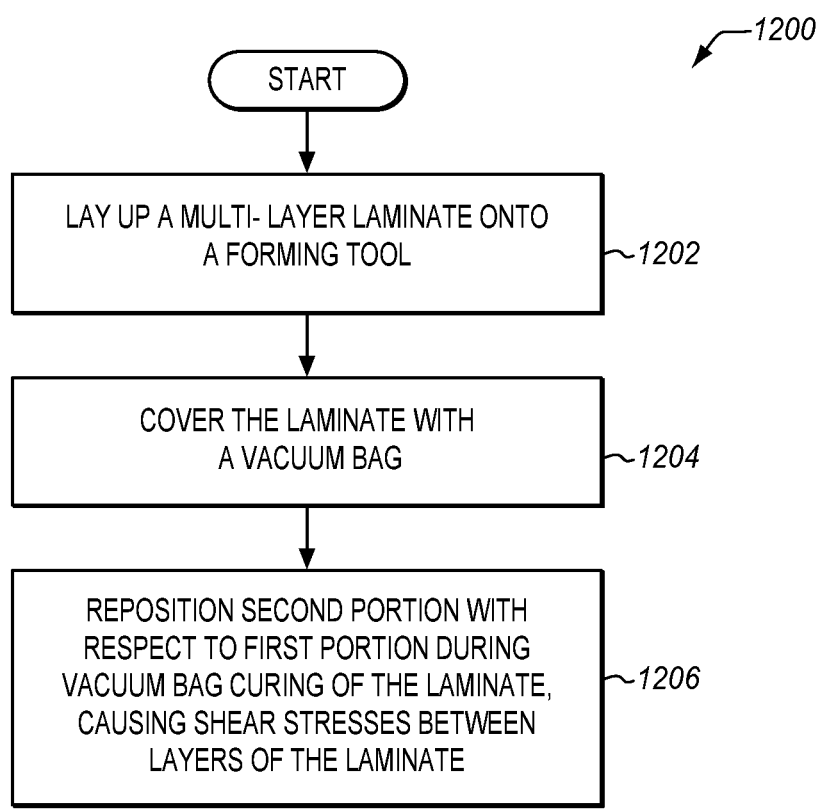
FIG. 12 is a flowchart illustrating a method of operating a forming tool in an exemplary embodiment.

FIG. 12 is a flowchart illustrating a method 1200 of operating a forming tool 600 in an exemplary embodiment. The steps of method 1200 are described with reference to forming tool 600 of FIG. 6, but those skilled in the art will appreciate that method 400 may be performed in other systems used for vacuum bag curing. The steps of the flowcharts described herein are not all inclusive and may include other steps not shown. The steps described herein may also be performed in an alternative order. Furthermore, the techniques described herein may be performed upon solid laminates as well as laminates that include a core (e.g., depending on the physical properties of that core).

Laminate 140 is laid-up onto forming tool 600, such that first portion 1112 of laminate 140 is laid-up onto main body 610 (e.g., by AFP machine 1160 based on instructions from controller 1150), while second portion 1122 of laminate 140 is laid-up onto surface 622 of platform 620, bridging over lateral gap 616 (step 1202). Next, laminate 140 is covered by vacuum bag 120 (step 1204) (e.g., based on instructions from controller 1150 to AFP machine 1160 or an operator). With vacuum bag 120 in place over laminate 140, pressure may be drawn at vacuum bag 120 to force laminate 140 to tightly conform to forming tool 600.

As a part of this process, pressure applied by vacuum bag 120 may overcome forces applied by biasing device 630 to hold platform 620 in place during forming. This causes platform 620 to change its position and/or orientation. Alternatively, controller 1150 may detect an increase in pressure from vacuum bag 120 (e.g., via input from a pressure sensor), and may dynamically direct biasing device 630 to reposition platform 620 and therefore portion 1122 (step 1206). This in turn causes portion 1122 of laminate 140 to change shape, as shown in FIG. 10. This also causes shear stresses between layers 142 and 144 of laminate 140, which beneficially enhances the strength of laminate 140 after forming has completed.

Utilizing the techniques described above, the shape of a laminate may be dynamically changed during vacuum bag forming in order to enable the laminate to form a complex shape. Furthermore, these techniques may be utilized without increasing the complexity of the lay-up process for a laminate, which in turn reduces the labor involved in fabricating a complex part.

EXAMPLES

In the following examples, additional processes, systems, and methods are described in the context of forming tools that dynamically change the shape of a laminate 140 during forming. FIGS. 13-16 illustrate a second forming tool that utilizes a hinging mechanism, FIGS. 17-20 illustrate a third forming tool with support grooves that are located in a position that minimizes resin infiltration, and FIGS. 21-24 illustrate a multi-platform forming tool capable of creating complex parts.

Figure 15:
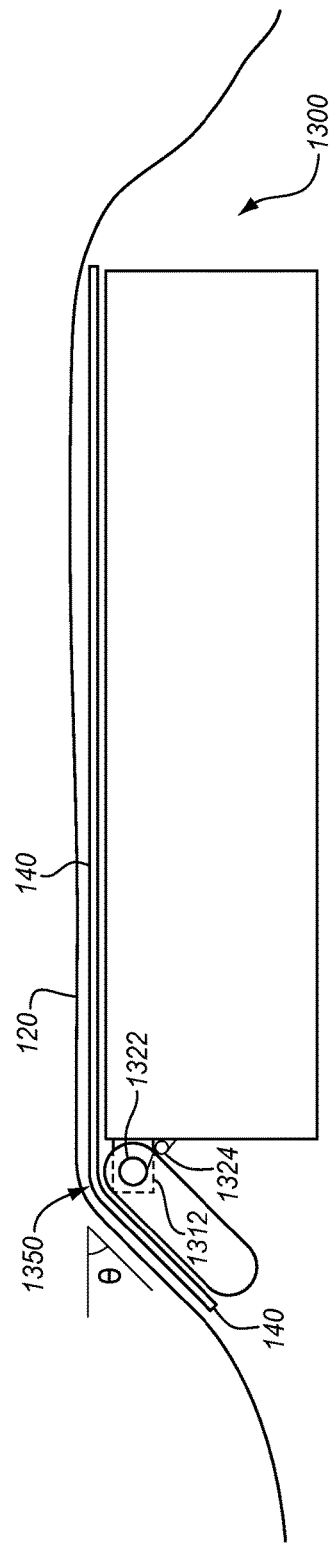
FIGS. 15-16 are views illustrating the second forming tool after forming has begun in an exemplary embodiment.
Figure 16:
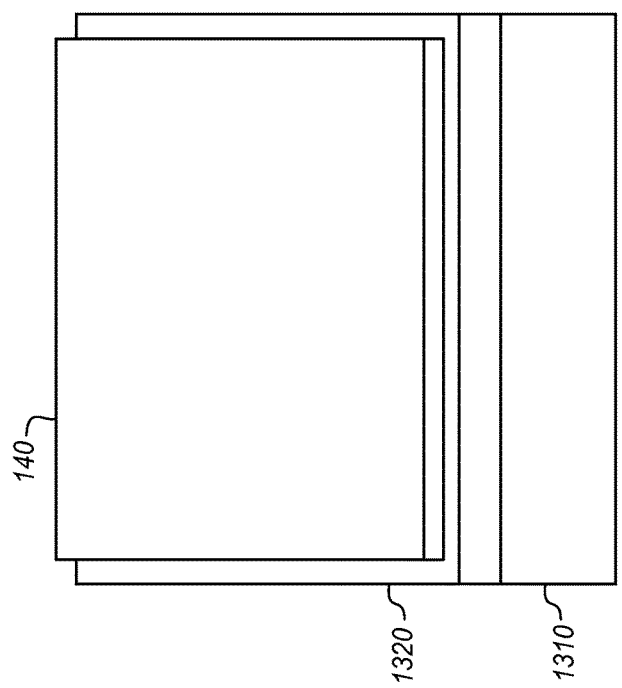

FIGS. 13-14 are views illustrating a second forming tool 1300 in an exemplary embodiment. Specifically, FIG. 13 is a side view and FIG. 14 is a front view. In this embodiment, forming tool 1300 includes main body 1310 and mobile platform 620. As shown in FIG. 13, portion 1122 of laminate 140 is laid-up over platform 1320, while portion 1124 of laminate 140 is laid-up over main body 1310. Supports 1312 extend from main body 1310, and together with pin 1322 form a hinge 1326 which is fixed to platform 1320. Vacuum bag 120 covers laminate 140 and forming tool 600 as shown in FIG. 13. However, vacuum bag 120 is not shown in FIG. 14 for clarity. Spring 1324 is attached to pin 1322, as well as location 1325 on body 1310. Spring 1324 provides a resting force capable of maintaining platform 1320 substantially level with main body 1310. However, spring 1324 deflects in response to pressure applied when air is evacuated from vacuum bag 120 (e.g., about one atmosphere of pressure). This causes platform 1320 to rotate about hinge 1326 when vacuum bag 120 applies pressure. FIGS. 15-16 are views illustrating forming tool 1300 after forming has begun in an exemplary embodiment. Specifically, FIG. 15 is a side view and FIG. 16 is a front view. As shown in these FIGS., when platform 1320 is rotated by an angle θ (e.g., 9°), laminate 140 changes shape.

FIGS. 17-18 are views illustrating a third forming tool 1700 in an exemplary embodiment. In this embodiment, forming tool 1700 includes grooves 1712, which mate with extensions 1722 protruding from platform 1720. Springs 1714 within grooves 1712 operate as mechanisms that actuate the motion of platform 1720. As shown in FIGS. 19-20, platform 1720 descends by a height H when pressure from vacuum bag 120 increases and overcomes the resting forces applied by springs 1714 to hold platform 1720 aligned with main body 1710. This causes interlaminar shear at location 1950 of FIG. 19.

Figure 23:
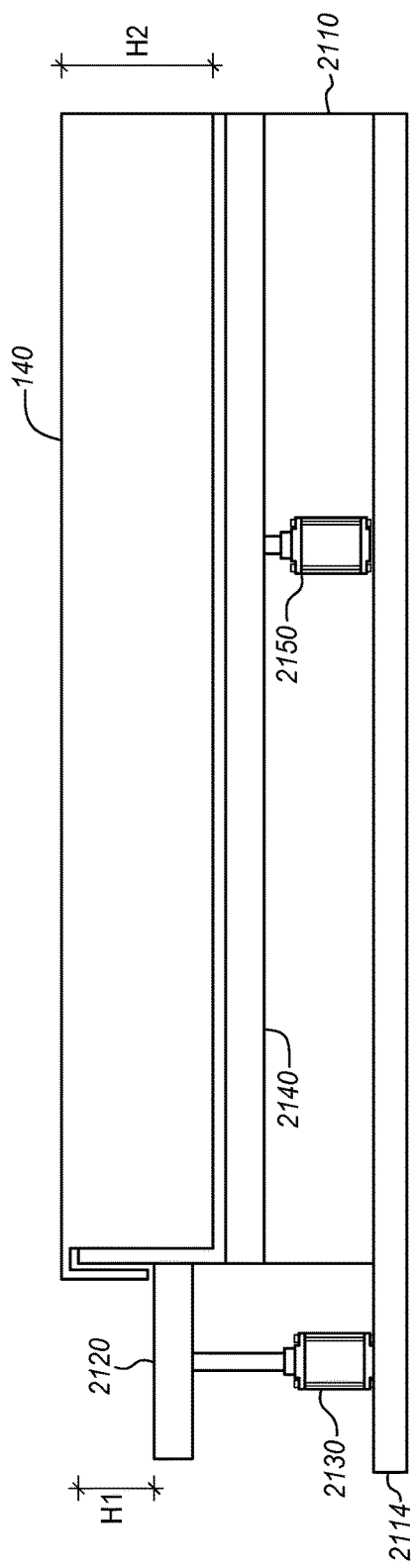
FIGS. 23-24 are views illustrating the fourth forming tool after forming has begun in an exemplary embodiment.
Figure 24:
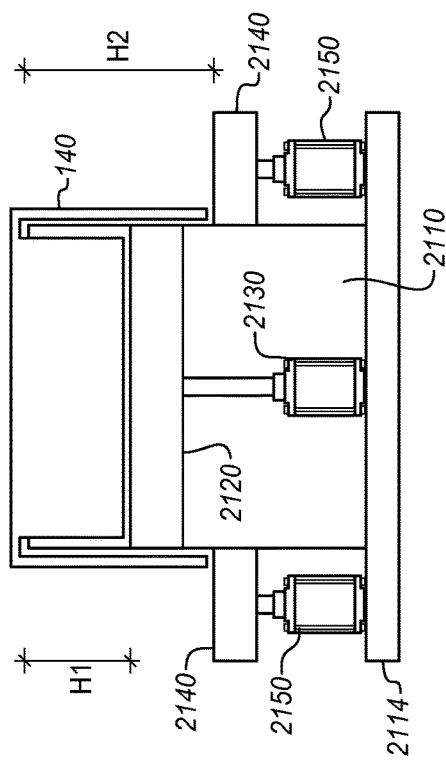

FIGS. 21-22 are views illustrating a fourth forming tool 2100 in an exemplary embodiment. Forming tool 2100 includes main body 2110, support element 2114, platforms 2120 and 2140, and biasing devices 2130 and 2150. Each biasing device (2130, 2150) may adjust a height of its corresponding platform by a different amount in response to pressure from vacuum bag 120. For example, as shown in FIGS. 23-24, platform 2120 descends by a height H1, while platforms 2140 descend by a height H2.

Figure 25:
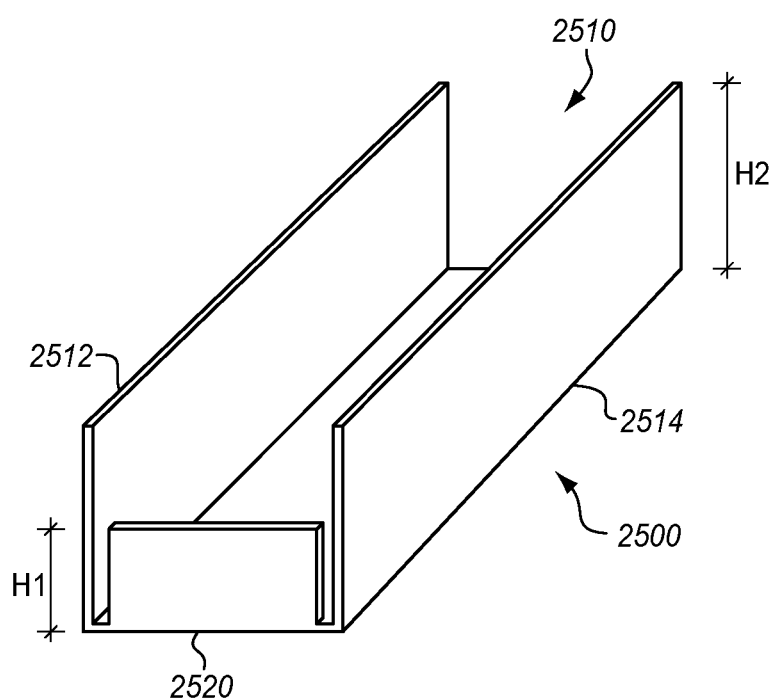
FIG. 25 is a perspective view of a completed composite part in an exemplary embodiment.

FIG. 25 is a perspective view of a completed composite part 2500 in an exemplary embodiment. Composite part 2500 may be fabricated, for example, by forming tool 2100. Composite part 2500 exhibits a C-channel 2510 defined by sidewalls 2512 and 2514, and composite part 2500 also exhibits a shear tie 2520. C-channel 2510 is created by the action of platforms 2140 of FIG. 21, while shear tie 2510 is created by the action of platform 2120 of FIG. 21.

Figure 26:
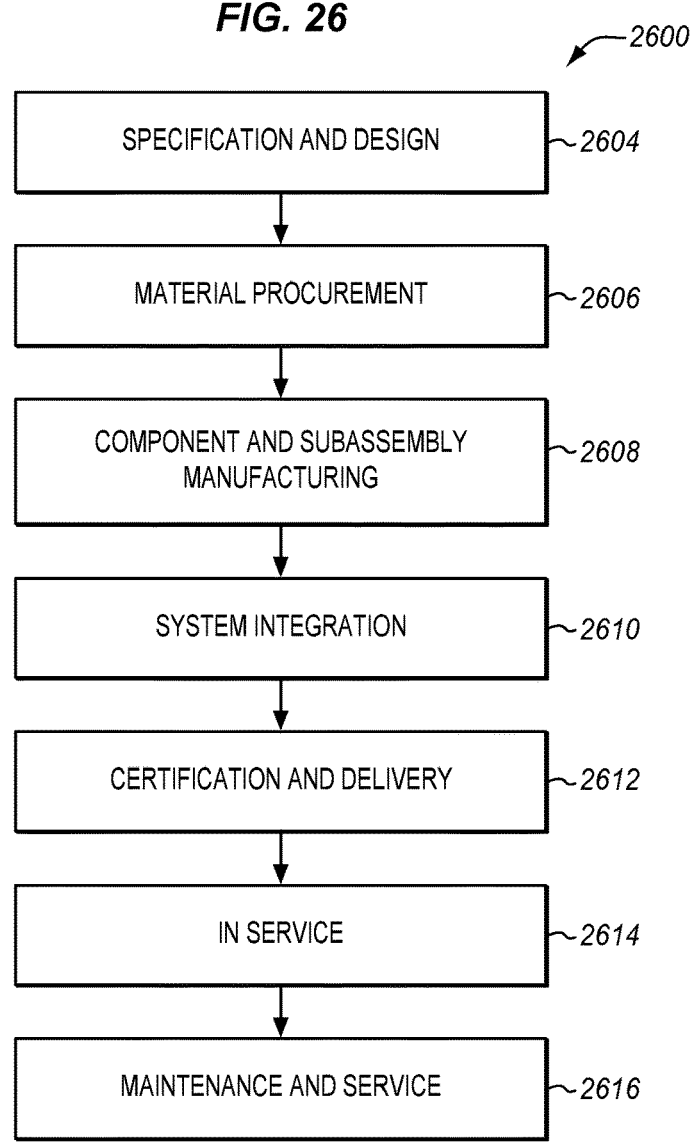
FIG. 26 is a flow diagram of aircraft production and service methodology in an exemplary embodiment.
Figure 27:
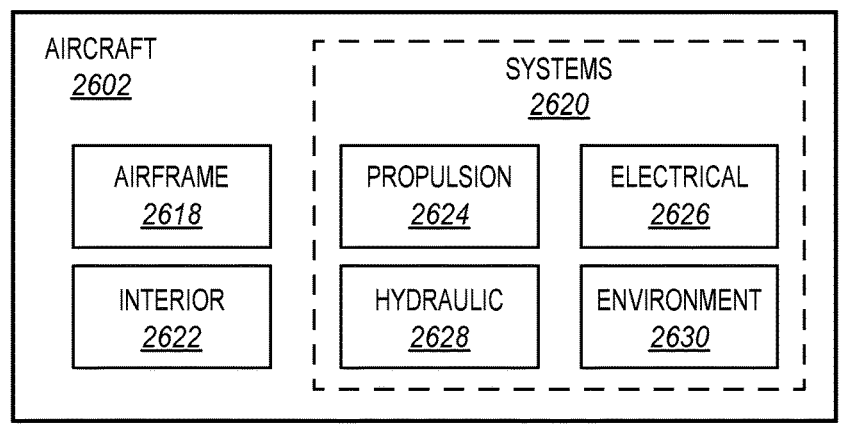
FIG. 27 is a block diagram of an aircraft in an exemplary embodiment.

Referring more particularly to the drawings, embodiments of the disclosure may be described in the context of an aircraft manufacturing and service method 2600 as shown in FIG. 26 and an aircraft 2602 as shown in FIG. 27. During pre-production, exemplary method 2600 may include specification and design 2604 of the aircraft 2602 and material procurement 2606. During production, component and subassembly manufacturing 2608 and system integration 2610 of the aircraft 2602 takes place. Thereafter, the aircraft 2602 may go through certification and delivery 2612 in order to be placed in service 2614. While in service by a customer, the aircraft 2602 is scheduled for routine maintenance and service 2616 (which may also include modification, reconfiguration, refurbishment, and so on).

Each of the processes of method 2600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 27, the aircraft 2602 produced by exemplary method 2600 may include an airframe 2618 with a plurality of systems 2620 and an interior 2622. Examples of high-level systems 2620 include one or more of a propulsion system 2624, an electrical system 2626, a hydraulic system 2628, and an environmental system 2630. Any number of other systems may be included. Although an aerospace example is shown, the principles of the invention may be applied to other industries, such as the automotive industry.

Apparatus and methods embodied herein may be employed during any one or more of the stages of the production and service method 2600. For example, components or subassemblies corresponding to production stage 2608 may be fabricated or manufactured in a manner similar to components or subassemblies produced while the aircraft 2602 is in service. Also, one or more apparatus embodiments, method embodiments, or a combination thereof may be utilized during the production stages 2608 and 2610, for example, by substantially expediting assembly of or reducing the cost of an aircraft 2602. Similarly, one or more of apparatus embodiments, method embodiments, or a combination thereof may be utilized while the aircraft 2602 is in service, for example and without limitation, to maintenance and service 2616.

In one embodiment, laminate 140 comprises a portion of airframe 118, and is fabricated during component and subassembly manufacturing 1108 via the use of enhanced forming tools discussed above. Laminate 140 may then be assembled into an aircraft in system integration 1110, and then be utilized in service 1114 until wear renders laminate 140 unusable. Then, in maintenance and service 1116, laminate 140 may be discarded and replaced with a newly manufactured laminate 140 created using the enhanced forming tools discussed above. The forming tools (600, 1300, 1700, 2100) may be utilized throughout component and subassembly manufacturing 1108 in order to manufacture laminate 140.

Any of the various computing and/or control elements shown in the figures or described herein may be implemented as hardware, a processor implementing software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method comprising:
   laying up a multi-layer fiber reinforced laminate onto a forming tool, the laminate comprising a first portion laid up onto a main body of a forming tool, and a second portion laid up onto a platform of the forming tool such that the second portion is aligned with the first portion;
   covering the laminate with a vacuum bag that presses the laminate against the platform; and
   repositioning the second portion with respect to the first portion by rotating the platform during vacuum bag forming of the laminate, causing shear stresses between layers of the laminate.

2. The method of claim 1 further comprising:
   holding the second portion of the laminate aligned with the first portion before the vacuum bag applies pressure to the forming tool during forming; and
   repositioning the platform in response to the pressure, causing the platform to alter a shape of the laminate during forming.

3. The method of claim 1 wherein:
the platform is rotated at an angle of ninety degrees relative to the main body.

4. The method of claim 3 further comprising:
laying up the laminate across a lateral gap that separates the main body from the platform,
wherein vertically displacing the platform causes the shear stresses.

5. The method of claim 1 wherein:
repositioning the second portion comprises rotating the platform about a hinge connected to the main body.

6. The method of claim 1 further comprising:
curing the laminate into a composite part while pressure is applied by the vacuum bag;
removing the composite part from the forming tool; and
laying up a new laminate onto the forming tool.

* * * * *